(12) United States Patent
Rueda et al.

(10) Patent No.: US 12,130,164 B2
(45) Date of Patent: Oct. 29, 2024

(54) DOSING DEVICE

(71) Applicant: SOCIETE DES PRODUITS NESTLE S.A., Vevey (CH)

(72) Inventors: Luis Fernando Rueda, Munsingen (CH); Laura Canovas, Fribourg (CH); Miguel Daniel Tovar Nuez, Morges (CH)

(73) Assignee: Societe des Produits Nestle S.A., Vevey (CH)

( * ) Notice: Subject to any disclaimer, the term of this patent is extended or adjusted under 35 U.S.C. 154(b) by 87 days.

(21) Appl. No.: 17/907,747

(22) PCT Filed: Mar. 30, 2021

(86) PCT No.: PCT/EP2021/058353
§ 371 (c)(1),
(2) Date: Sep. 29, 2022

(87) PCT Pub. No.: WO2021/198290
PCT Pub. Date: Oct. 7, 2021

(65) Prior Publication Data
US 2023/0132527 A1 May 4, 2023

(30) Foreign Application Priority Data
Mar. 30, 2020 (EP) .................................... 20166897

(51) Int. Cl.
*G01F 19/00* (2006.01)
*D21J 1/02* (2006.01)
(Continued)

(52) U.S. Cl.
CPC .............. *G01F 19/002* (2013.01); *D21J 1/02* (2013.01); *D21J 1/06* (2013.01); *D21J 1/16* (2013.01); *D21J 3/00* (2013.01)

(58) Field of Classification Search
CPC ...................................................... G01F 19/002
See application file for complete search history.

(56) References Cited

U.S. PATENT DOCUMENTS

| | | | | |
|---|---|---|---|---|
| 3,013,436 | A * | 12/1961 | Dailey | G01F 19/002 73/426 |
| 2015/0284911 | A1 * | 10/2015 | Juvonen | B32B 21/13 442/385 |
| 2019/0270558 | A1 * | 9/2019 | Pietraniec | B65D 51/20 |

FOREIGN PATENT DOCUMENTS

| | | |
|---|---|---|
| CN | 206964482 | 2/2018 |
| JP | 04343029 | 11/1992 |

(Continued)

*Primary Examiner* — Jamel E Williams
(74) *Attorney, Agent, or Firm* — K&L Gates LLP

(57) ABSTRACT

The present invention relates to a dosing device (too) that is integrally made of molded pulp fiber. The dosing device (too) comprises a container portion (200) for receiving and retaining a dosage material having an opening (250) at an upper side (US) of the dosing device (too) to access the dosage material. The dosing device (too) comprises a handle portion (300) for manually moving the container portion (200) in a dosing process. The handle portion (300) is connected to an outer surface (211) of the container body (210) by a connecting portion (350) of the handle portion (300). A rim portion (252) of the container portion (200), which delimits the opening (250), and the handle portion (300) extend in a common plane (CP) and define a circumferential edge (101) of the dosing device (101). The dosing device (100) comprises a ribbing portion (400), which extends from the circumferential edge (101) at least at the handle portion (300) to a lower side of the dosing device (too), for dissipating mechanical stresses arising in the dosing process. The invention relates also to a method for manufacturing the dosing device (too) and a use of the dosing device (too) for dosing a dosage material.

20 Claims, 7 Drawing Sheets

(51) Int. Cl.
  *D21J 1/06* (2006.01)
  *D21J 1/16* (2006.01)
  *D21J 3/00* (2006.01)

(56) References Cited

FOREIGN PATENT DOCUMENTS

| | | | |
|---|---|---|---|
| JP | H08110258 A | | 4/1996 |
| JP | 08176999 A | * | 7/1996 |
| JP | 09123300 A | * | 5/1997 |
| JP | 2006349630 A | | 12/2006 |
| JP | 2009122029 A | | 6/2009 |
| KR | 20020026221 | | 4/2002 |
| WO | 2018167676 | | 9/2018 |
| WO | WO-2021198290 A1 | * | 10/2021 ................ D21J 1/02 |

\* cited by examiner

DOSING DEVICE

CROSS REFERENCE TO RELATED APPLICATIONS

The present application is a National Stage of International Application No. PCT/EP2021/058353, filed on Mar. 30, 2021, which claims priority to European Patent Application No. 20166897.7, filed on Mar. 30, 2020, the entire contents of which are being incorporated herein by reference.

1. FIELD OF THE INVENTION

The present invention relates to a dosing device, a method for manufacturing the same and a use of the dosing device for dosing a dosage material. The dosing device is integrally made of molded pulp fiber and comprises a container portion for receiving and retaining a dosage material, a handle portion for manually moving the container portion in a dosing process and a ribbing portion for supporting the container body.

2. TECHNICAL BACKGROUND

Dosing devices for food and beverage powders, such as dosage or measuring spoons, are usually disposable and made from plastic. Plastic has the advantages that the dosing device can be made lightweight, its hygiene can easily be ensured and precise dosing is possible. Thus, despite deriving a number of benefits from using plastic for the dosing device, there are disadvantages that need to be taken into consideration.

In particular, disposal of plastic waste can be problematic. Although different types of plastic exist that are recyclable, they often are not recycled correctly, but the plastic ends up in landfill or sea water, thereby having a negative impact on the environment.

Known alternatives to plastic, which are recyclable and environmentally less problematic, are materials such as wood or paper, which are already used, for example for tableware spoons. However, disadvantages of these materials are their comparatively high weight and their low suitability for facilitating precise dosing. Also, wood or paper-based materials restrain the freedom of designing dosing devices.

For example, if manufactured from one piece of wood, the making of a dosing device will require a lot of raw material. Similarly, if the dosing device is made from several pieces of wood, somehow these wood pieces would have to be joined together, for example by using a glue. However, the provision of the glue increases the risk that the environment or the dosage material is contaminated. Also, the connection via glue may lead to gaps between the individual pieces, which may lead to a reduction of the dosing accuracy and the hygiene of the dosing device.

For some applications, however, such as the preparation of powdered food compositions, precise dosing is essential. Compositions to be reconstituted by adding a liquid, such as milk or water, need to be dosed precisely to ensure not only optimal taste but also to ensure the optimal nutritional composition of the final product. This is essential for compositions such as powdered infant formula or powdered nutritional compositions administered to vulnerable or hospitalized people.

A further alternative to plastic is molded pulp fiber. Molded pulp fiber may comprise, for example, lignocellulosic fibers, typically from recycled paperboard, paper and/or newsprint and is typically used for the manufacture of packaging, such as egg cartons, as well as for the manufacture of insulation, storage or protection materials.

However, molded pulp fiber typically has a rough surface, which makes precise dosing difficult and may lead to hygiene issues as its rough surface may absorb or retain dosage material. Moreover, molded pulp fiber has a relatively low tensile strength and a relatively high brittleness, which makes the material less suitable for a device that is used frequently in a manual dosing process. In addition, known design principles that are commonly used for the design of other materials, such as plastic, glass or metallic materials, cannot easily be applied to molded pulp fiber due to the irregularities in the material and the complexity of the material structure.

However, molded pulp fiber has the advantage that it is an environmentally friendly, sustainable and recyclable material that is suitable for coming into close contact with humans, thereby making it a suitable material for a dosing device.

Any reference to prior art documents in this specification is not to be considered an admission that such prior art is widely known or forms part of the common general knowledge in the field.

3. SUMMARY OF THE INVENTION

It is therefore an object of the present invention to provide a dosing device made of a recyclable and environmentally friendly material, such as molded pulp fiber, that can be used repeatedly and frequently in a manual dosing process. In the dosing process, a high level of dosing accuracy is required, thereby increasing the demands on the design of the dosing device to achieve this objective. Moreover, despite using molded pulp fiber, it is desired to find a dosing device that is flexible and mechanically resilient. Also, the hygiene of the dosing device should be maintained at a high level.

The above objects are to be accomplished by means of the independent claims. The dependent claims advantageously study further the central idea of the invention.

A first aspect of the invention relates to a dosing device.

The term "dosing device" may refer to a device that can be used for dosing. For example, a dosing device can be any device intended to measure and deliver a defined quantity of a dosage material, such as a composition to be dosed. Also, the dosing device may be intended to transport dosage material between two places, for example between a packaging containing the dosage material and a bowl, in which the dosage material is to be dispensed. For example, the dosing device may be a measuring, dosage or medicine spoon.

The dosing device is integrally made of molded pulp fiber.

The term "molded pulp fiber" may refer to a fibrous material comprising lignocellulosic fibers. Typically, molded pulp fiber can be obtained through pulping or by chemically or mechanically separating cellulose fibers from plant material, like wood, fiber crops or wastepaper.

The dosing device comprises a container portion, which has a defined volume for receiving and retaining a dosage material. The container portion has a container body that delimits the defined volume. The container body has a rim portion that circumferentially delimits an opening at an upper side of the dosing device to access the defined volume.

The term "upper side of the dosing device" may refer to a side of the dosing device that faces an operator of the dosing device in a filled position, in which the dosing device is oriented such that dosage material (completely filling the container body) is retained.

The dosing device further comprises a handle portion for manually moving the container portion relatively to the dosage material in a dosing process. The handle portion is connected to an outer surface of the container body by a connecting portion of the handle portion and extends from the container body along a longitudinal axis. The term "outer surface of the container body" may refer to a surface that is an outer part or side of the container body; it may extend (completely) on the outside of the container body.

The rim portion and the handle portion extend in a common plane. Moreover, the rim portion and the handle portion define a circumferential edge of the dosing device that extends in the common plane.

The term "circumferential edge" may refer to the margin or periphery of the dosing device, for example, on its upper side.

The dosing device further comprises a ribbing portion, which extends from the circumferential edge at least at the handle portion to a lower side of the dosing device such that mechanical stresses acting on the container body in the dosing process are dissipated by the handle portion.

The term "lower side of the dosing device" may refer to the underside of the dosing device in the filled position described above, i.e. a side opposite to the "upper side of the dosing device".

The term "mechanical stress" may refer to any type and kind of mechanical load, such as forces, bending or torsional moments or any combination thereof. Mechanical stresses during the dosing process may arise, for example, when the dosing device is filled with dosage material or comes into contact with a wall portion of packaging containing the dosage material.

The term "dissipating mechanical stresses" may refer to a re-distribution, spreading or reduction of the mechanical load, for example by damping, deformation or stretching of the material.

In other words, the present invention provides a dosing device that is integrally made of molded pulp fiber. Thus, the dosing device may be made entirely of molded pulp fiber and/or may be made as a single piece such that all parts of the dosing device may be contained within the dosing device. Thereby, it is possible to provide a dosing device that is biodegradable and recyclable and is made from a sustainable material. In addition, the risk of having gaps between certain parts of the dosing device is reduced, thereby increasing the dosing accuracy and hygiene. The dosing device comprises a container portion with an opening that allows to acquire, retain and release a defined amount of a dosage material inside its container body. Thereby, it is possible to provide the dosing device with a high dosing accuracy. Moreover, the dosing device comprises a handle portion for manually handling and grasping the dosing device, whereby the handle portion is connected to the container body and extends along a longitudinal axis therefrom. Thereby, it is possible to increase the dosing accuracy since the filling amount of dosage material into the container body can be influenced through manual control of a dosing device's user. Furthermore, the rim portion, which delimits the opening in the container body, and the handle portion extend in a common plane and define a circumferential edge of the dosing device therein. Thereby, it is possible to avoid any material being retained on the handle portion, whereby the dosing accuracy and hygiene can be ensured. Moreover, extending in the common plane further allows the dosing device to rest stably on a surface, such as a kitchen table or a conveyor belt, for storage, transportation or production purposes. In addition, this configuration makes it easier to use a levelling system to homogenize and control the quantity of dosage material, like powder, received in the dosing device. For example, a knife may be passed over the surface delimited by the common plane to remove any powder in excess of the defined volume in the container portion. The dosing device further comprises a ribbing portion that extends from the circumferential edge at least at the handle portion to the lower side of the dosing device. Thereby, the handle portion is additionally supported by the ribbing portion so that forces or moments arising during the filling process can be dissipated. Thus, the mechanical resilience and flexibility of the dosing device is improved as the mechanical load on the container body is not only distributed over a wider cross-sectional area but also reduced by the ribbing portion due to its particular design.

Thus, the dosing device of the present invention overcomes the disadvantages of the prior art and achieves the objectives set out above.

According to a preferred embodiment, the ribbing portion may extend from the circumferential edge at least at the handle portion opposite sides of the longitudinal axis. Alternatively or additionally, the ribbing portion may extend from the circumferential edge at the rim portion. Also, the ribbing portion may extend from the entire circumferential edge of the dosing device. Therein, the ribbing portion may extend along (at least parts of) the circumferential edge in a continuous manner.

Thereby, it can be achieved that the ribbing portion is provided on parts of the dosing device that are mechanically strained during the dosing process. Thus, the mechanical properties, such as strength and rigidity, of the dosing device can be improved further.

Also, the design, production and manufacturing of the dosing device can be simplified and improved.

According to a further preferred embodiment, the ribbing portion may extend at its end opposite to the circumferential edge at least partially in a lower side plane that is preferably parallel and/or offset to the common plane. Preferably, the lower side plane may delimit at least a part of the lower side of the dosing device along the handle portion.

Thereby, it can be achieved that the design and the manufacture of the dosing device can be improved. In particular, by providing the lower side of the dosing device along the handle portion within one plane it is possible to remove the dosing device during manufacturing with a single trimming step, for example by (manually) cutting along the aforementioned plane or using a stamping or punching device.

According to a preferred embodiment, the ribbing portion may increase at the connecting portion in size. Preferably, the ribbing portion may increase at the connecting portion (in size) in a continuous manner and/or with a constant slope.

For example, the ribbing portion may extend at the connecting portion from the circumferential edge to the lower side of the dosing device such that the ribbing portion expands with increasing distance from the rim portion. Alternatively or additionally, the ribbing portion may widen laterally from the longitudinal axis at the connecting portion with reducing distance from the rim portion. The ribbing portion may extend laterally at the connecting portion such that the ribbing portion transitions onto the rim portion in a preferably continuous manner.

Thereby, it can be achieved that material can be saved, thereby making the dosing device more lightweight and cost effective. In addition, the ribbing portion can be provided such that it functions as a support strut for the container body and/or the connecting portion. Also, the ribbing portion can support the connecting portion and the handle portion such that mechanical forces acting on the container body are split between the handle portion and the ribbing portion and re-directed, thereby reducing the mechanical load at least for the connecting portion. Moreover, it is possible to make the dosing device more resilient and preferably more resilient with regards to stresses caused by forces or bending moments with a specific or predetermined direction or orientation than to stresses from forces or bending moments with a different direction or orientation.

According to a further preferred embodiment, the ribbing portion may extend from the circumferential edge at the rim portion such that a space between the ribbing portion and the container body is formed. Preferably, the space may be (integrally) filled.

By providing the ribbing portion in this manner, it is possible to increase the effective diameter of the container body, thus making it more resilient with regards to mechanical stress. Moreover, by (integrally) filling the space (such as a cavity) between the container body and the ribbing portion it can be avoided that dosage material accumulates in the space, thereby ensuring dosage accuracy and hygiene.

According to a preferred embodiment, the ribbing portion may be at least partially concave towards the upper side of the container body when seen from above.

Thereby, it is possible to avoid that any part of the ribbing portion accumulates dosage material during the dosing process. Instead, the design of the ribbing portion favours self-cleaning of its outer surfaces, for example by gravitationally induced sliding of any dosage material picked up by the ribbing portion during the dosing process. Thus, dosing accuracy and hygiene can be ensured. Also, the design favours an important aspect of hygiene that surfaces critical for hygiene ought to be visible at a first glance. In the present case, surfaces critical for hygiene face at least a similar direction as the direction the dosing device faces during dispensing of the dosage material.

According to a further preferred embodiment, the ribbing portion may have a L-shaped cross-section when seen along the handle portion.

Alternatively or additionally, the ribbing portion may have a cross-section when seen along the circumferential edge, which comprises at least two (preferably at least three) ribbing sections. The cross-section may preferably be provided at least at the connecting portion or at the handle portion or at the dosing device. The ribbing sections may extend successively in a row away from the handle portion and may be tilted with respect to each other and with respect to the common plane towards the lower side of the dosing device at a defined slope angle, respectively.

Preferably, the number of the ribbing sections and/or width and/or slope angle of at least some of the ribbing sections may change at least partially along the circumferential edge of the dosing device (or preferably at least at the connecting portion).

Therein, the changing width of ribbing sections of the at least some ribbing sections may decrease (preferably continuously) towards the container portion and/or towards a distal end of the handle portion opposite to the container portion.

In other words, at least some of the ribbing sections that may change their width, preferably may decrease in width, towards one and/or the other end of the dosing device.

Moreover, preferably the cross-section of the ribbing portion at the connecting portion continuously merges into and preferably remains constant along the ribbing portion at the rest of the handle portion and/or along the ribbing portion at the container portion.

By providing the ribbing portion with in such configuration, it is possible to improve the rigidity of the dosing device. Therein, the design of the ribbing portion with a cross-section having two or more, preferably at least three different slope angles was found to be particularly advantageous. Even more advantageous was found a cross-section having partially increasing and partially decreasing slope angles with increasing distance of the ribbing sections from the handle portion. For example, peaks of mechanical stress at certain parts of the dosing device can be avoided as the ribbing sections have a defined and stress optimised profile. Moreover, due to this particular layout of the ribbing portion, the hygiene can be improved as dosage material can slide easily downwards when holding the dosing device in a filled position and thus, dosage material retention on the handle portion can be avoided.

According to a further preferred embodiment, the connecting portion may be adjacent to the rim portion. The ribbing portion may be provided and/or extend laterally from the connecting portion when seen from above.

Thereby, the mechanical stress on the handle portion can be reduced as the distance between the origin of the load during the dosing process, which is typically the container body, and the connecting portion is reduced. Hence, a lever arm defined by the distance between the container body and the connecting portion can be reduced. Thus, the mechanical properties of the design device can be improved.

According to a preferred embodiment, the defined volume may be delimited by the rim portion, a bottom portion and an inner lateral surface of the container body that extends therebetween. Preferably, the inner lateral surface may extend from the rim portion to the bottom portion in a continuous manner. Additionally or alternatively, the inner lateral surface may have a constant profile or tapers from the rim portion towards the bottom portion.

Thereby, it can be achieved that the defined volume is defined by a structure that comprises no steps or recesses that may retain or absorb dosage material. Thus, the hygiene and dosage accuracy of the dosing device can be improved.

According to a further preferred embodiment, the inner lateral surface of the defined volume may be smooth and/or may comprise a coating. Preferably, the coating may be a biodegradable substance or material.

Thereby, the risk of material retention or absorption during the dosing process can be reduced even further. Additionally, it may be easier to clean the defined volume. By providing also the coating as a biodegradable substance or material it is possible to provide the dosing device as a fully biodegradable object.

According to a preferred embodiment, the handle portion may have a symmetrical profile when seen from above. Alternatively or additionally, the handle portion and the corresponding ribbing portion may have a cross-section with a symmetrical profile and/or a cross-section opened towards the lower side of the dosing device (when seen along the longitudinal axis). Preferably, the handle portion and the corresponding ribbing portion may have (combined) a U-shaped cross-section (when seen along the longitudinal axis).

With this particular design it is possible to improve the manufacturing of the dosing device as its configuration is simplified. Also, the profile is beneficial for carrying mechanical loads, thereby improving the mechanical properties of the dosing device.

According to a further preferred embodiment, the handle portion may taper preferably straight from the distant end of the handle portion towards the connecting portion (when seen from above). Alternatively or additionally, the handle portion may widen towards the container portion. Preferably, the handle portion may widen from the connecting portion (when seen from above) (towards the container portion).

Thereby, it is possible to balance aspects of ergonomic design requirements and requirements of the mechanical properties of the dosing device. Thus, it is possible to improve the dosing accuracy during the dosing process as the dosing device can be handled more delicately and precisely while maintaining the mechanical properties of the dosing device.

According to a preferred embodiment, the defined volume may range from 1 to 20 $cm^3$, 2 to 15 $cm^3$, 3 to 10 $cm^3$, or 8 to 9 $cm^3$. Alternatively or additionally, the handle portion may extend from 3 to 20 cm, 5 to 15 cm, 5 to 10 cm, or 7 to 8 cm from the connecting portion to the distant end of the handle portion, preferably along the longitudinal axis.

Thereby, it is possible to provide the dosing device with dimensions that are particular suitable for manual handling and dosing. In addition, the mechanical properties can be improved even further for these dimensions.

A second aspect of the present invention relates to a method for manufacturing the dosing device according to the first aspect of the present invention. The method for manufacturing the dosing device comprises the following steps:
dewatering pulp material;
pressing the dewatered pulp material into the form of the dosing device; and
drying the formed dosing device.

The term "pulp material" or "pulp" may refer to any material that comes from a fiber source and that can be used as starting material for the (finished) "molded pulp fiber" that is described above.

Preferably, the method for manufacturing may comprise also the step of trimming the dosing device along external edges defined by the ribbing portion.

A third aspect of the present invention relates to a use of the dosing device for dosing a dosage material. The dosing device corresponds to the first aspect of the present invention and/or is manufactured with the manufacturing method according to the second aspect of the present invention. The dosage material may be from the group consisting of powdered or granulated compositions, for example food compositions.

Preferably, the container portion of the dosing device may be filled with the dosage material. Further, a separate appliance having at least one straight edge may be used to scrape off any excess material from the filled container portion so that the container portion contains (only) a (desired) predetermined amount of the dosage material.

4. BRIEF DESCRIPTION OF DRAWINGS

Further features, advantages and objects of the present invention will become apparent for the skilled person when reading the following detailed description of embodiments of the present invention and when taking in conjunction with the figures of the enclosed drawings.

In case numerals have been omitted from a figure, for example for reasons of clarity, the corresponding features may still be present in the figure.

5. DETAILED DESCRIPTION

Figure 1:
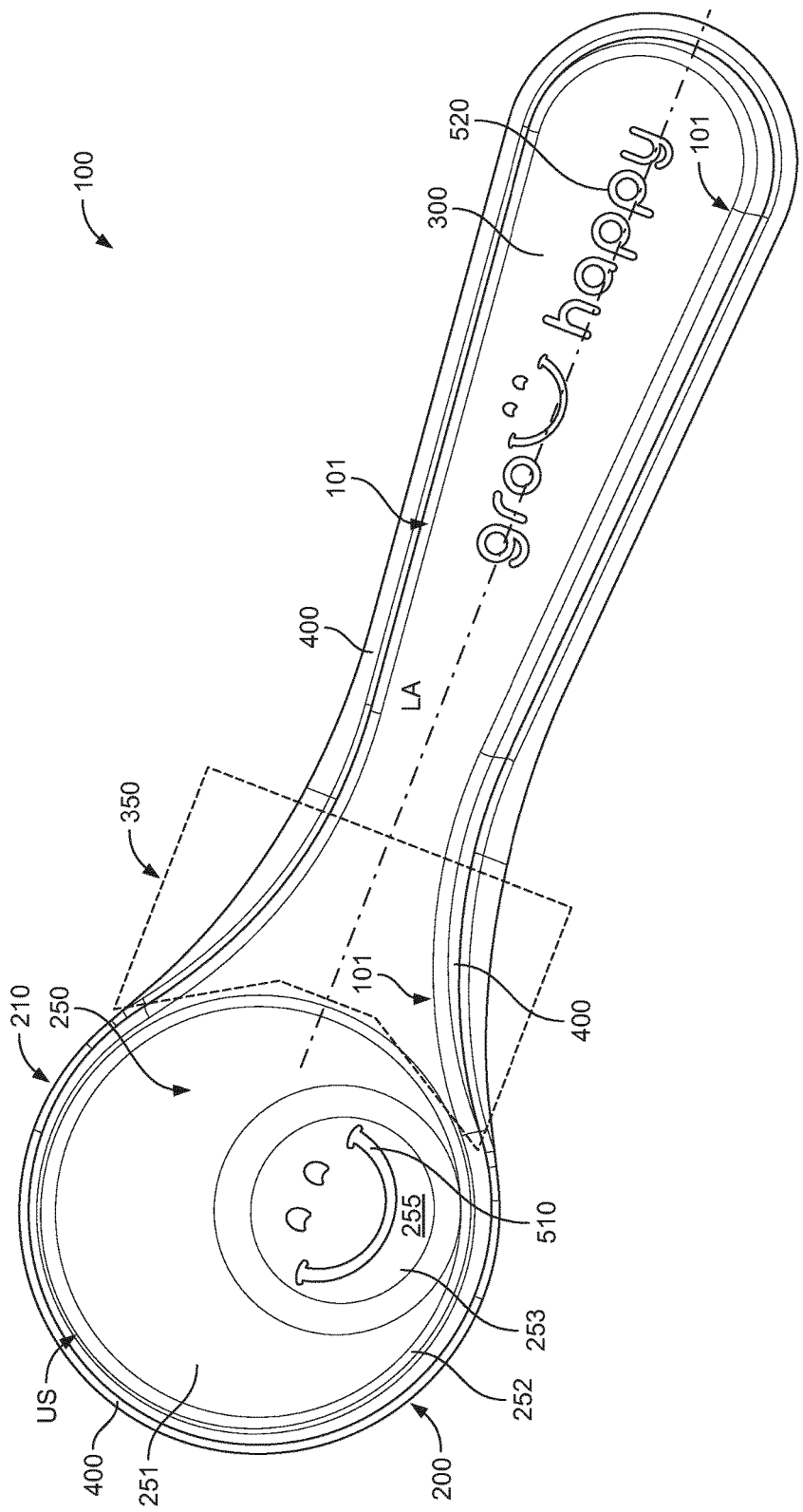
FIG. 1 shows a perspective view of the upper side of an embodiment of the dosing device according to the present invention.
Figure 2:
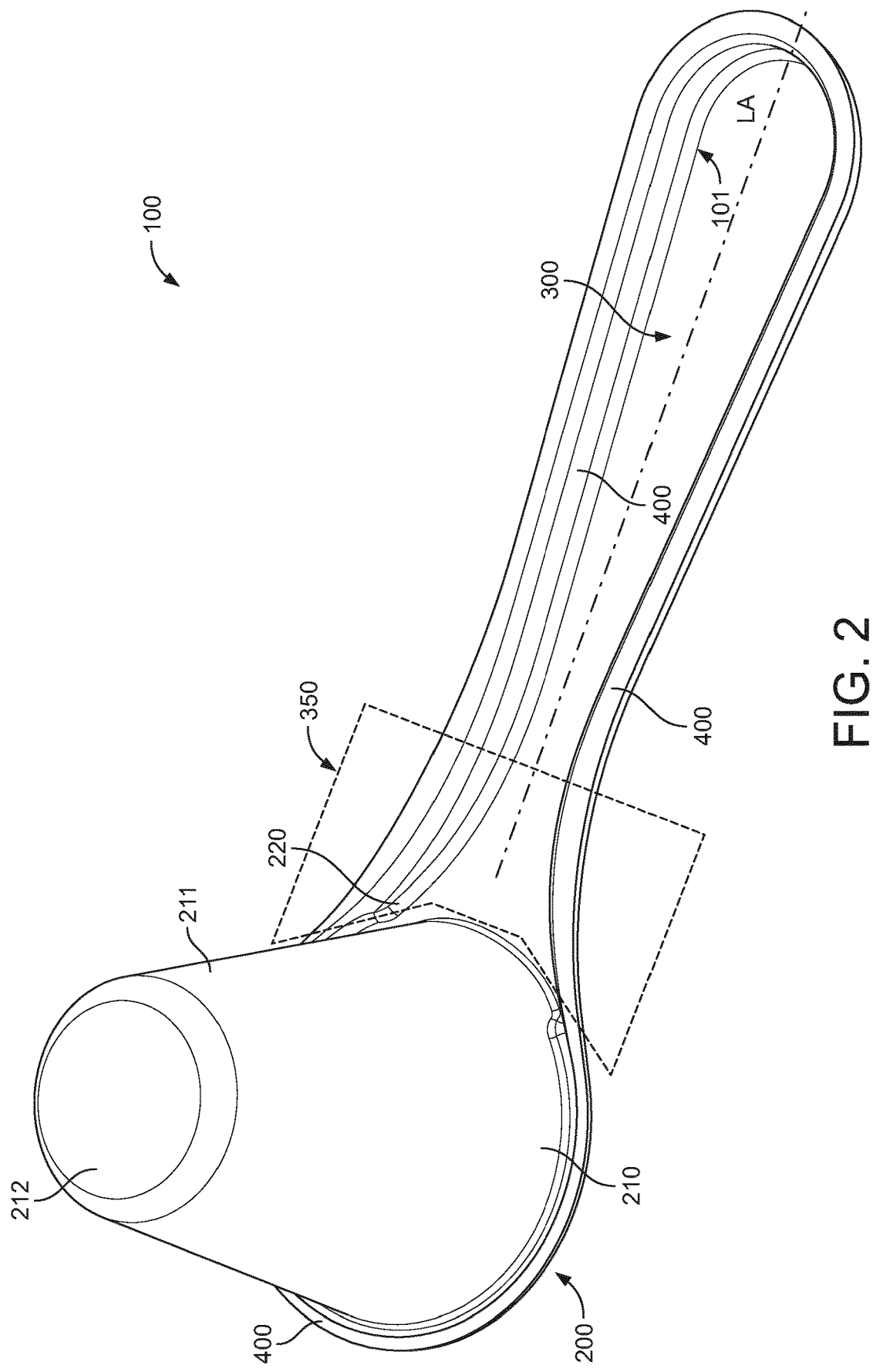
FIG. 2 shows a perspective view of the lower side of the dosing device in FIG. 1.
Figure 3:
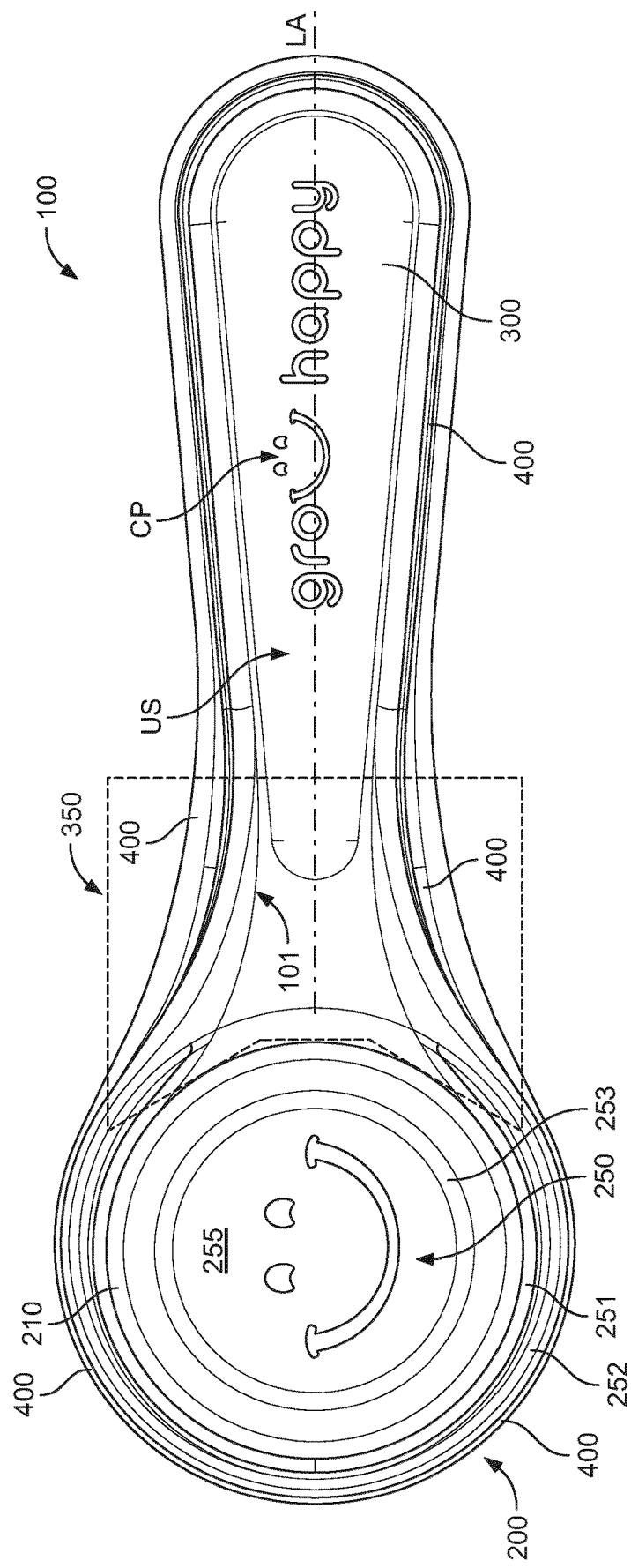
FIG. 3 shows a front view of the upper side of the dosing in FIG. 1.
Figure 4:
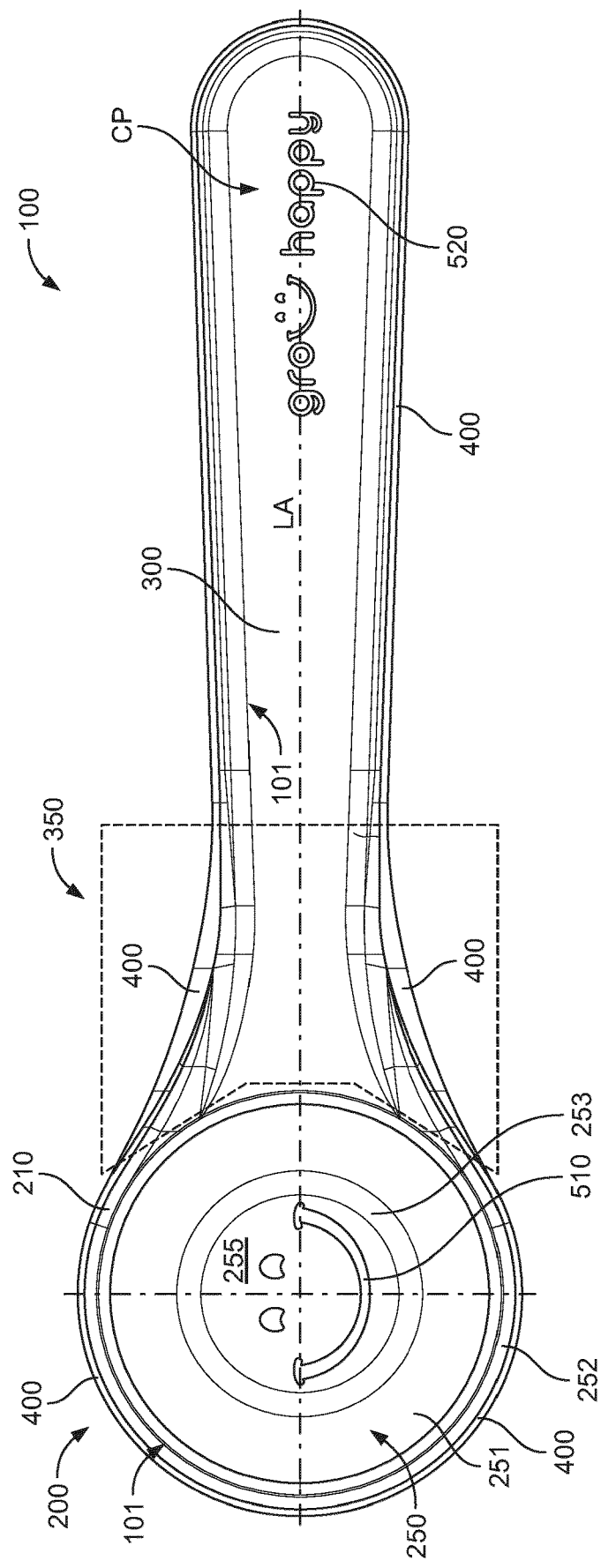
FIG. 4 shows a second front view of the upper side of the dosing device in FIG. 1 highlighting the contours thereof.

The figures show different views of an embodiment of the dosing device 100 according to the present invention.

The dosing device 100 is integrally made of molded pulp fiber.

Preferably, the dosing device wo may be made as a single piece, part or component. For example, the dosing device 100 may be a spoon, a measuring spoon or a dosage spoon as exemplarily illustrated in the figures.

The dosing device 100 may be made from recyclable and/or recycled material. Also, the dosing device 100 may be biodegradable and/or compostable.

Molded pulp fiber may be made from pulp comprising cellulosic fibrous material that is prepared by chemically and/or mechanically separating cellulose fibers from material containing cellulose fibers. The material containing cellulose fibers may be selected from the group consisting of bamboo, sugar cane, sugar beet root, wood, fiber crops, waste paper, and/or rags, or combinations thereof.

The material containing cellulose fibers may comprise a defined ratio between long fibers and short fibers. In particular, the material may comprise not less than 20 vol.-% of softwood long fibers, not less than 15 vol.-% of softwood long fibers, or not less than 10 vol.-% of softwood long fibers. The remaining fibers may be hardwood fibers, non-wood short fibers, or a combination thereof.

The pulp used for the dosing device 100 may comprise cellulose, hemicellulose and/or lignin.

Hemicellulose provides a better adhesion between cellulose nanofibrils, thereby it may contribute to enhanced tensile properties of the dosing device 100. Thus, preferably the dosing device 100 may be made from pulp with an increased hemicellulose content as experiments pointed towards a higher stiffness and tensile strength for this composition in comparison to pulp with a lower hemicellulose content. Lignin in the pulp has an influence on the texture and flexibility of the dosing device 100.

Accordingly, the ratio of cellulose, hemicellulose and lignin of the pulp for the dosing device 100 may be configured (adjusted) such that the resulting dosing device 100 has appropriate mechanical properties, such as bending stiffness. Preferably, a ratio of 80:19:1 for cellulose, hemicellulose and lignin may be used.

The pulp used for the dosing device 100 may further comprise a compound selected from the group consisting of alkyl ketene dimer wax, a fluorine containing polymer moiety, sodium silicate, or combinations thereof.

Alkyl ketene dimer wax may be used for modifying surface properties of the dosing device 100. Typically, the use of alkyl ketene dimer wax in the pulp may provide the dosing device 100 with an increased and lasting hydrophobicity.

A fluorine containing polymer moiety in the pulp may impart to the dosing device 100 an improved resistance to low surface tension fluids, leading for example to an improved grease, oil, wax and solvent repellence. The fluorine containing polymer moiety may be a fluorine containing polymer moiety approved for use in contact with food products, for example. For example, the fluorine containing polymer moiety may be a copolymer comprising carbon and fluorine moieties, a polymer comprising phosphate and fluorine moieties, or a fluoroalkyl polymer. Examples may be selected from the group consisting of perfluoroalkylethylphosphate diethanolamine, ammonium di-[2-(N-ethyl-heptadecafluorosulfonamido)ethyl] phosphate, poly(2-(N-methyl-heptadecafluorosulfonamido)ethyl acrylate)-co-(2,3-epoxypropylacrylate)-co-(2-ethoxyethylacrylate)-co-(2-(2-methylpropenyloyloxy)ethyl-trimethyl-ammonium chloride), or combinations thereof.

A configuration of the pulp used for the dosing device 100 including sodium silicate may lead to increased mechanical strength. Sodium silicate may also be used as additive in the pulp during a bleaching process, for example with hydrogen peroxide.

The dosing device 100 may be produced by pulp molding.

The dosing device 100 comprises a container portion 200 for receiving and retaining a dosage material. The container portion 200 is illustrated in FIGS. 1 to 7.

For example, the dosage material may be any powdered or granulated composition to be dosed. Also, the dosage material may be a liquid. Furthermore, the dosage material may be food. In particular, the dosage material may be powdered or granulated food, such as nutritional or infant formulas, growing-up milks, milk modifiers, cocoa-based beverage powders, cocoa malt-based beverage powders, coffee, instant food compositions, fruit flavoured beverage powders, spice mixtures, drink thickeners and pet food. Thus, the term "food" may include any substance, whether processed, semi-processed or raw, which is intended for human consumption. In particular, this may include drinks, chewing gum and any substance, which has been used in the manufacture, preparation or treatment of "food". However, the term "food" does not include cosmetics, tobacco or substances used only as drugs. Thus, the dosing device 100 may be particularly suitable for food or for dosing food compositions.

The container portion 200 may have any shape that allows it to take up a certain amount of dosage material. For example, the shape of the container portion 200 may be adapted so that it corresponds to a typical shape that resembles the brand of the manufacturer of the dosage material. Typically, the container portion 200 (or the container body 210) may have a cylindrical, oval, cubic or a cuboidal shape. For example, in the figures the container portion 200 is exemplarily illustrated as a truncated cone. However, this enumeration is not delimiting but merely an example. Furthermore, the container portion 200 may be configured such that it is particularly suitable for scooping movements.

For example, the container portion 200 may have a material thickness in the range of 300 µm-3 mm, 500 µm-2 mm, 600 µm-1 mm.

The container portion 200 has a container body 210 that delimits a defined volume 255, in which dosage material can be received and retained. The container body 210 has a rim portion 252 that circumferentially delimits an opening 250 at an upper side US of the dosing device 100 to access the defined volume 255. FIGS. 1 and 3 to 7 show the dosing device 100 facing upwards. The container body 200 further comprises an outer surface 211. In FIGS. 2 and 5 to 7, it is exemplarily illustrated that the container body 200 is delimited on its outside by the outer surface 211. The outer surface 211 may be a mantle surface (lateral surface) of the container body 210. The outer surface 211 may also include the bottom surface 212, which may define the underside of the container portion 200.

On the inside of the container body 200, the defined volume 255 may preferably be delimited by the rim portion 252, a bottom portion 253 and an inner lateral surface 251 of the container body 210 extending between the rim portion 252 and the bottom portion 253. This can be seen in FIGS. 1 and 3 to 7.

Thus, the opening 250 in the container body 210 defines an entry for dosage material to pass into a space, i.e. the defined volume 255, inside the container body 210. For example, the opening 250 may be a hole in the container body. The rim portion 252 may be configured for scooping and/or retaining dosage material.

Preferably, the inner lateral surface 251 may extend from the rim portion 252 to the bottom portion 253 in a continuous manner. Thereby, the inner lateral surface 251 may have a constant profile. Alternatively, the inner lateral surface 251 may taper from the rim portion 252 towards the bottom portion 253 as illustrated in FIGS. 1 and 3 to 5. This arrangement allows to empty the defined volume 255 at the end of the dosing process more easily, thereby increasing the dosing accuracy.

Preferably, the dosing device 100 or at least the inner lateral surface 251 may be smooth. Smoothening may be achieved during the manufacturing process. For example, an application of pressure and heat during manufacturing may be used to flatten a surface to be treated. Preferably, the dosing device 100 or at least the inner lateral surface 251 may be resistant against moisture or water uptake. This may be achieved during manufacturing, for example, by pressing and heat application. Alternatively or additionally, the dosing device 100 or at least the inner lateral surface 251 may comprise a coating, which preferably may be of a biodegradable substance or material. The dosing device 100 and/or the inner lateral surface 251 may be coated with a compound or a mixture of compounds, wax, kaolinite, calcium carbonate, bentonite, talc, polyethylene, polyolefin, silicone, and/or biopolymers.

The defined volume 255 may have any shape or form. In particular, the defined volume 255 may have a cylindrical, oval, cubic or a cuboidal shape. In the figures the defined volume 255 is exemplarily illustrated as a truncated cone. Also, the shape of the defined volume 255 may correspond with the shape of the container body 210 as exemplarily illustrated in the figures.

The defined volume 255 may correspond to an amount of dosage material needed for a single consumption occasion or it may correspond to a fraction thereof. Preferably, the defined volume 255 may range from 1 to 20 cm³, 2 to 15 cm³, 3 to 10 cm³, or 8 to 9 cm³. However, this enumeration is not delimiting but merely an example.

The dosing device further comprises a handle portion 300 for manually moving the container portion 200 relatively to the dosage material in a dosing process. The handle portion 300 comprises a connecting portion 350, by which the outer surface 211 of the container body 210 is connected to the handle portion 300. This is illustrated in FIGS. 1 to 7. Therein, the connecting portion 350 is exemplarily indicated by dashed lines. The connecting portion 350 may be adjacent to the rim portion 252 of the container body 210.

The handle portion 300 extends along a longitudinal axis LA and may have a symmetrical profile when seen from above as illustrated in FIGS. 1 to 4. Preferably, the handle portion 300 may taper (laterally from the longitudinal axis LA) from the end of the handle portion 300, which is (most) distant to the container portion 200, towards the connecting portion 350. Moreover, the handle portion 300 may (then) (laterally) widen towards the container portion 200 starting from the connecting portion 350 (along the longitudinal axis LA).

The handle portion 300 may have a length that is preferential for manual handling or grasping. Preferably, the handle portion 300 may extend along the longitudinal axis LA from 3 to 20 cm, 5 to 15 cm, 5 to 10 cm, or 7 to 8 cm from the connecting portion 350 to the distant end of the handle portion 300.

Further, the handle portion 300 may have a material thickness in the range of 300 μm-5 mm, 500 μm-4 mm, or 700 μm-3 mm. The handle portion 300 of the dosing device 100 may be configured such that its material thickness is higher than the material thickness of the container portion 200. Thereby, manual handling can be improved. For example, the handle portion 300 and the container portion 200 may have a material thickness ratio in the range of 1.5:1 to 10:1, 2:1 to 5:1, or 3:1 to 4:1.

The dosing device 100 may have a length of less than 15 cm, less than 13 cm, less than 11 cm, less than 9 cm, less than 7 cm or less than 5 cm as longest dimension. If the longest dimension is considered the length of the dosing device 100, the width of the dosing device 100 may be less than 5 cm, less than 4 cm, less than 3 cm, less than 2 cm or less than 1 cm. For example, the dosing device 100 may have a length of less than 15 cm and a width of less than 4 cm. It may also have a length of less than 15 cm and a width of less than 3 cm. It may also have a length of less than 13 cm and a width of less than 3 cm. It may also have a length of less than 13 cm and a width of less than 2 cm. It may also have a length of less than 11 cm and a width of less than 2 cm.

The rim portion 252 and the handle portion 300 extend in a common plane CP. This is exemplarily illustrated FIG. 5. Moreover, the rim portion 252 and the handle portion 30o define a circumferential edge 101 of the dosing device 100. The circumferential edge 101 extends in the common plane CP. With this configuration, it can be achieved that after filling of the container portion 200 any excess dosage material can be scraped off with any appliance having a straight edge, such as a knife, so that as a result the container portion 200 is precisely filled up to the common plane CP. Preferably, the dosing device 100 may extend at its upper side US entirely in the common plane CP. Thus, the entire top surface of the handle portion 300 and the entire top surface of the container portion 300 may extend in the common plane CP. This is exemplarily illustrated in the figures.

The dosing device 100 comprises a ribbing portion 400. Thereby, the mechanical properties, such as the bending stiffness, of the dosing device 100 are improved. The ribbing portion 400 is illustrated in FIGS. 1 to 7.

A different approach to increase the bending stiffness of the dosing device 100 may be, for example, to adjust the composition of the pulp material (details described above) and/or the material thickness of the dosing device 100. However, it is a particular advantage of the present invention that modifications of the pulp composition or the material thickness can be avoided. Thus, with the present invention it is possible to increase the bending stiffness without having to provide additional or a more sophisticated pulp material.

The bending stiffness can be determined in accordance with ISO 5628. Preferably, the dosing device 100 may be configured such that it has a bending stiffness in the range of 10 to 80 mNm in a direction along the longitudinal axis LA and/or 5 to 40 mNm in direction transverse thereto.

The ribbing portion 400 extends from the circumferential edge 101 at least at the handle portion 300 from the common plane CP to a lower side of the dosing device 100 such that mechanical stresses acting on the container body 210 in the dosing process are dissipated by the handle portion 300.

Typically, bending moments or forces arise during the dosing process, as for example during scooping of dosage material with the dosing device 100. The dosing device 100 may be stopped by a sidewall of the packaging containing the dosage material and thereby, may be subjected to a bending moment originating from the scooping movement of the hand of the operator. Furthermore, the weight of the dosage material in the container body 210 may cause a bending moment on the dosing device 100. Typically, the weight of dosage material for powdered food compositions, which is to be scooped into the container body 210, may be in the range of 2 g to 30 g.

The ribbing portion 400 may protrude from the circumferential edge 101 at the handle portion 300 and at the container portion 200. In particular, the ribbing portion 400 may protrude (extend) from the circumferential edge 101 at the rim portion 252 as illustrated exemplarily in the figures. Also, the ribbing portion 400 may protrude (laterally) from the outer surface 211 of the container body 210.

The ribbing portion 400 may extend from the circumferential edge 101 at least at the handle portion 300 at opposite sides of the longitudinal axis LA. This is exemplarily illustrated in FIGS. 1 to 4, 6 and 7. Thus, the ribbing portion 400 may be provided symmetrically with respect to the longitudinal axis LA. Preferably, the ribbing portion 400 may extend from the entire circumferential edge 101 of the dosing device 100. Therein, the ribbing portion 400 may extend along (and from) the circumferential edge 101 in a continuous manner.

Also, the ribbing portion 400 may extend at least partially along the circumference of the container portion 200, the connecting portion 350 and the handle portion 300. In particular, the ribbing portion 400 may at least partially extend circumferentially along the rim portion 252. Also, the ribbing portion 400 may extend from the circumferential edge 101 at the rim portion 252. Also, the ribbing portion 400 may be provided or extend laterally from the connecting portion 350 when seen from above. This is exemplarily illustrated in FIGS. 1 to 4, 6 and 7.

The ribbing portion 400 at its (vertical) end opposite to circumferential edge 101 may extend at least partially in a lower side plane LSP that is parallel and offset to the common plane CP. This is exemplarily illustrated in FIGS. 1 to 5 but is particularly visible in FIG. 5. Thereby, the lower side plane LSP may delimit at least a part of the lower side of the dosing device 100 along the handle portion 300 as is shown exemplarily in FIGS. 2 and 5. Preferably, the ribbing portion 400 may extend from the circumferential edge 101 such that the (entire) ribbing portion 400 may be provided extending away from the common plane CP to the lower side of the dosing device 100.

The ribbing portion 400 may be at least partially concave towards the upper side US of the container body 210 when seen from above. This can be seen in FIGS. 1 to 7.

The ribbing portion 400 may increase at the connecting portion 350 in size in comparison to the remaining parts of the dosing device 100, i.e. the container portion 200 and the rest of the handle portion 300. Thereby, the ribbing portion 400 may increase in a continuous manner and/or with a constant slope. This is illustrated in FIGS. 1 to 7.

Figure 5:
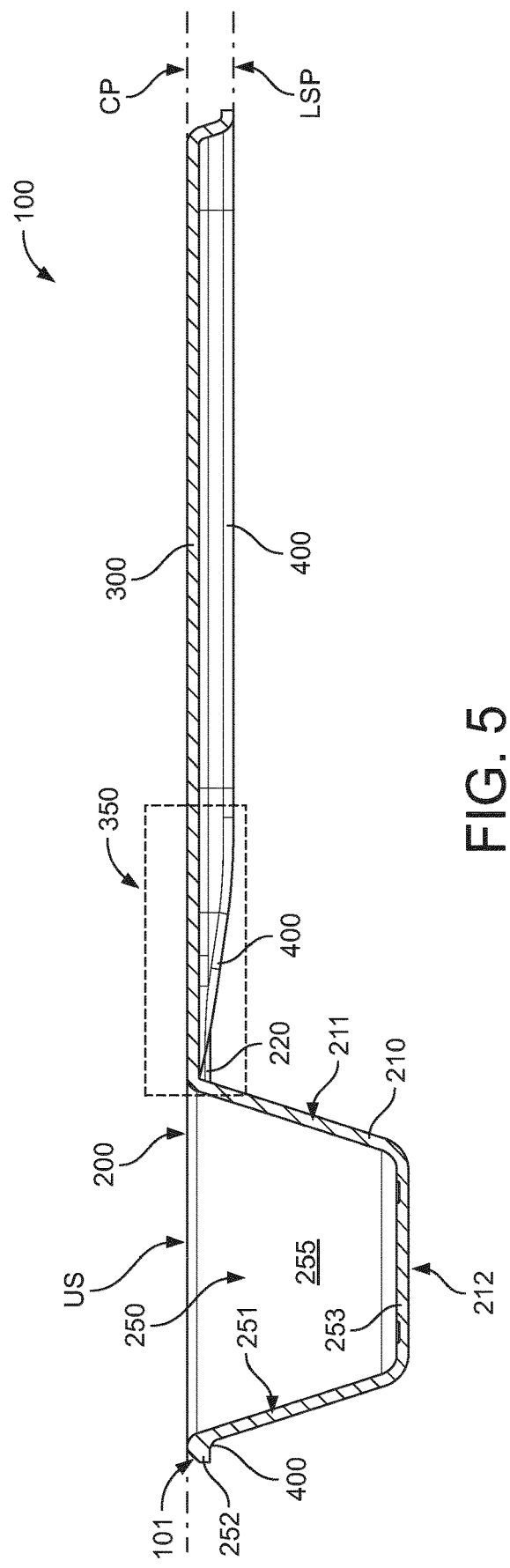
FIG. 5 shows a cross-section along the longitudinal extension of the dosing device in FIG. 1.

In particular, FIG. 5 illustrates exemplarily that the ribbing portion 400 may extend at the connecting portion 350 from the circumferential edge 101 to the lower side of the dosing device 100 such that the ribbing portion 400 expands with increasing distance from the rim portion 252. Thereby, the ribbing portion 400 may continuously increase its vertical extension between the common plane CP and its end (vertically) opposite thereto along the longitudinal axis LA (starting from the connecting portion 350).

Alternatively or additionally, the ribbing portion 400 may widen laterally from the longitudinal axis LA at the connecting portion 350 with reducing distance from the rim portion 252. Therein, the ribbing portion 400 may continuously reduce its lateral (horizontal) extension from the circumferential edge 101 at the handle portion 300 along the circumferential edge 101 (and/or the longitudinal axis LA) (starting from the connecting portion 350). This is illustrated exemplarily in FIGS. 1 to 4, 6 and 7. Therein, it is illustrated exemplarily that the ribbing portion 400 may extend laterally at the connecting portion 350 such that the ribbing portion 400 transitions onto the rim portion 252 in a continuous manner.

The ribbing portion 400 may have a L-shaped cross-section when seen along the handle portion 300 (or the circumferential edge 101). However, this is only an example and other shapes of the cross-section of the ribbing portion 400 are conceivable.

Figure 6:
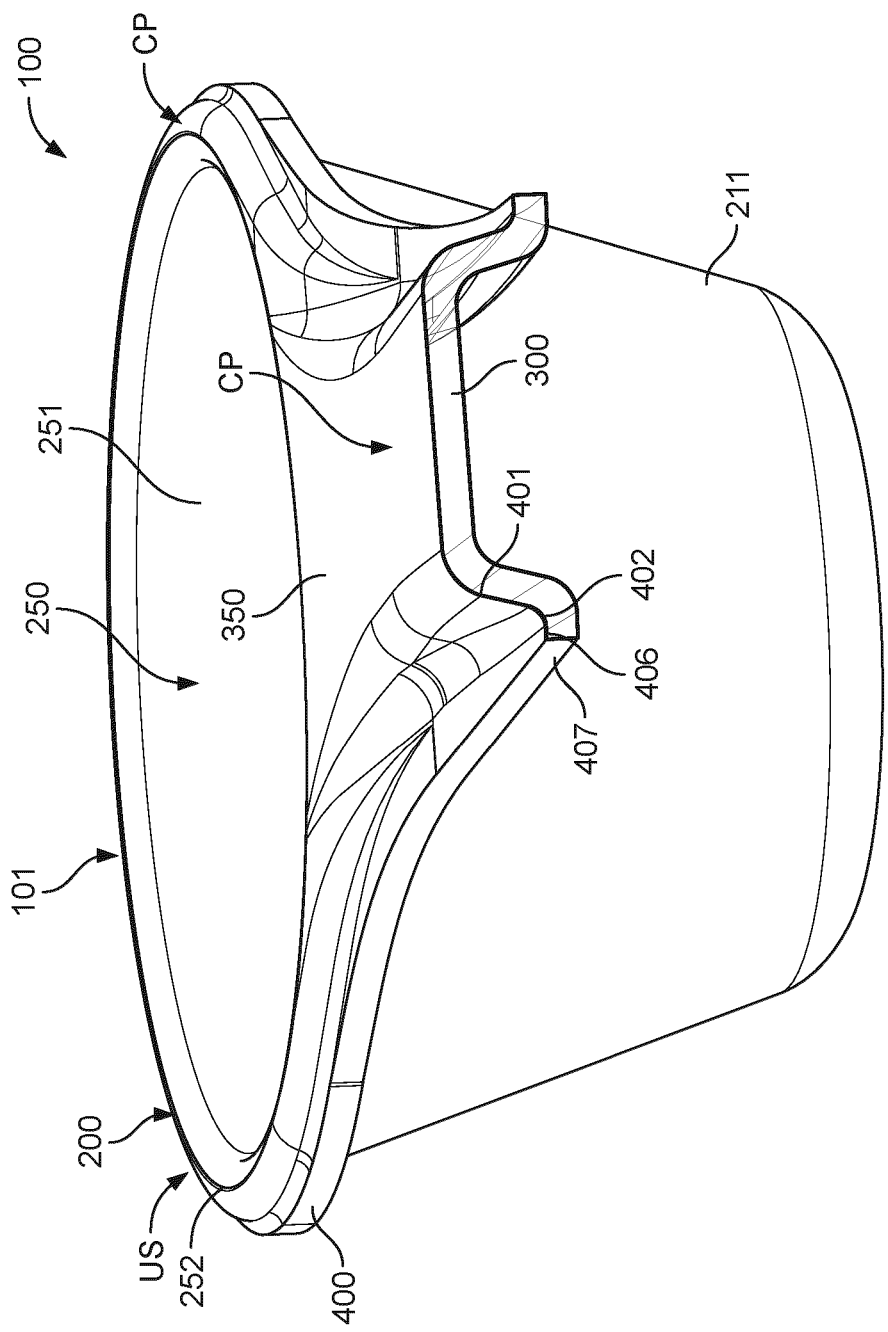
FIG. 6 shows a perspective view of the dosing device according to one embodiment of the present invention with a half-section drawing of the connecting portion at its distal end.
Figure 7:
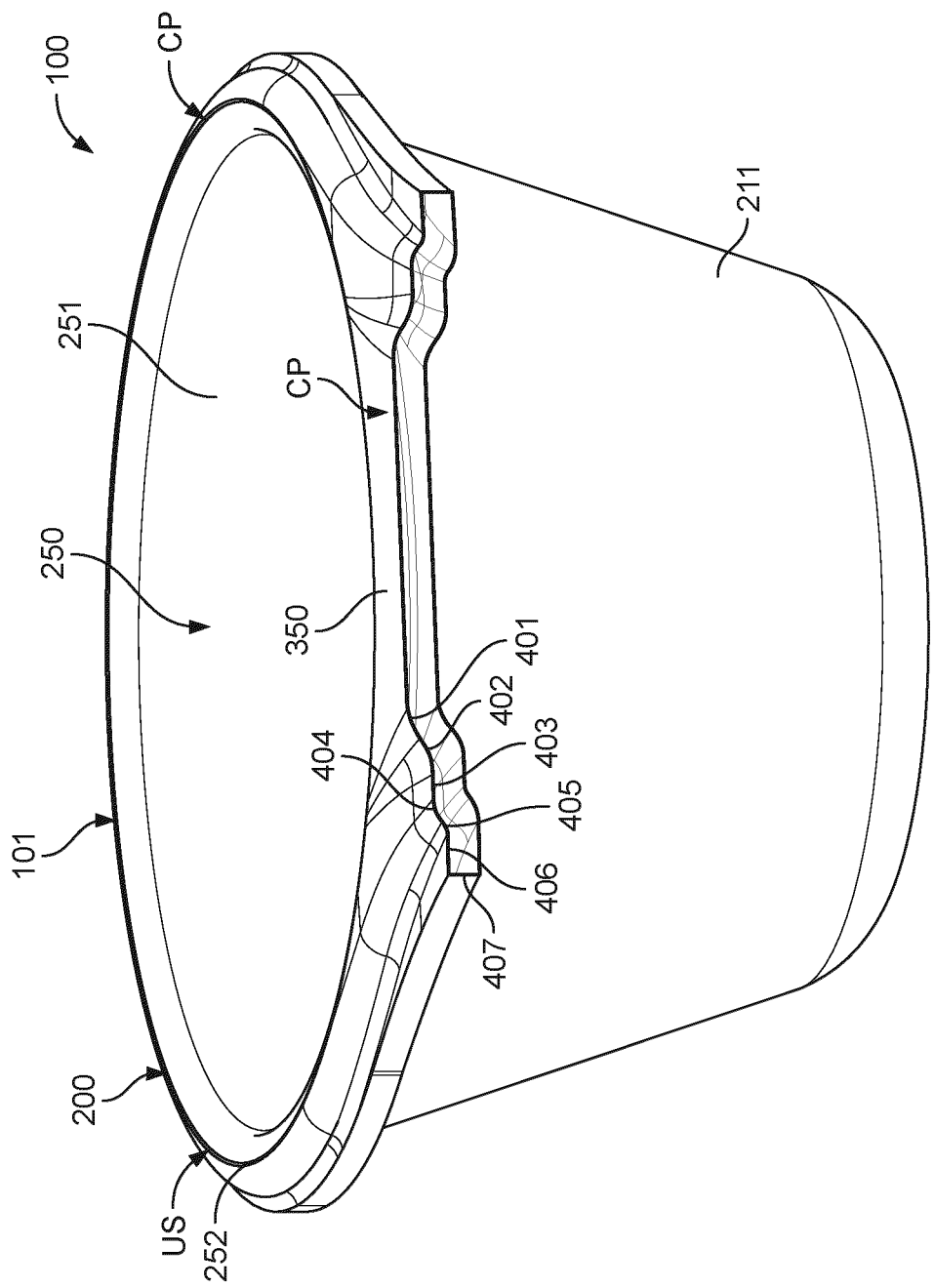
FIG. 7 shows a perspective view of the dosing device according to one embodiment of the present invention with a half-section drawing of the connecting portion at a part adjacent to the container portion.

Alternatively or additionally, the ribbing portion 400 may have, preferably at least at the connecting portion 350 or at the handle portion 300 or at the dosing device 100, a cross-section that—when seen along the circumferential edge 101—comprises at least two ribbing sections 401-407. The ribbing sections 401-407 are exemplarily illustrated in FIGS. 6 and 7. Therein FIG. 6 shows ribbing sections 401, 402, 406 and 407 while FIG. 7 shows ribbing sections 401 to 407.

For example, the ribbing sections 401-407 may be (external) edges of the ribbing portion 400 that may define the profile and thus, the cross-section of the ribbing portion 400. Each of the ribbing sections 401-407 may be a straight edge and/or curved edge. However, these are only examples. Two ribbing sections 401-407 may be distinguishable from each other by their assignment to a corresponding surface of the ribbing portion 400 or by discernible differences (such as steps) in the profile of the ribbing portion 400, for example.

From the exemplary illustration in the figures, it can be taken that the ribbing sections 401-407 may extend successively in a row away from the handle portion 300 towards the lower side of the dosing device 100. Moreover, the ribbing sections 401-407 may be tilted with respect to each other and with respect to the common plane CP towards the lower side of the dosing device 100 at a defined slope angle, respectively.

In particular, the number of the ribbing sections 401-407 of at least some of the ribbing sections 401-407 may change at least partially along the circumferential edge 101 of the dosing device 100 or preferably at least at the connecting portion 350. This feature becomes apparent by comparing the cross-sections exemplarily illustrated in FIG. 6, which shows a cross-section having only four ribbing sections 401-407, with the cross-section illustrated in FIG. 7, which comprises seven ribbing sections 401-407.

Alternatively or additionally, the width of at least some of the ribbing sections 401-407 may change at least partially along the circumferential edge 101 of the dosing device 100 (or preferably at least at the connecting portion 350). For example, the width may be taken as the (actual) length of the contour of the respective ribbing section 401-407. For example, in FIG. 6 (showing the end of the connecting portion 350 removed from the container portion 200) the first ribbing section 401 has a relatively long width in comparison to its width in FIG. 7 (showing a section of the connection portion 350 in close proximity to the container portion 200).

Alternatively or additionally, the slope angle of at least some of the ribbing sections 401-407 may change at least partially along the circumferential edge 101 of the dosing device 100 (or preferably at least at the connecting portion 350). This is exemplarily illustrated in FIGS. 6 and 7. For example, the ribbing section 401 may have at the end of the connecting portion 350 distant to the container portion 200 a relatively steep slope angle (see FIG. 6). In comparison, the ribbing section 401 may have a relatively flat slope angle at the end of the connecting portion 350 close to the container portion 200 (see FIG. 7).

Preferably, the changing width of ribbing sections of the at least some ribbing sections 401-407 may (continuously) decrease towards the container portion 200 and/or towards a distal end of the handle portion 300 opposite to the container portion 200. This is exemplarily illustrated for ribbing sections 401, 402, 406. For example, ribbing section 406 may have a tapered shape at both of its ends when seen from above.

The outer edge of the cross-section of the ribbing portion 400 may be formed by the ribbing section 407, which may be substantially perpendicular to the common plane CP and/or tilted away from the circumferential edge 101.

Preferably, the cross-section of the ribbing portion 400 at the connecting portion 350 continuously merges into and preferably remains constant along the ribbing portion 400 at the rest of the handle portion 300 and/or the ribbing portion 400 at the container portion 200. For example, all figures illustrate that the aforementioned L-shaped cross-section of the ribbing portion 400 may remain constant for the rest of the handle portion 300 and similar can be found for the ribbing portion 400 along the circumference of the rim portion 252.

Preferably, the configuration of the cross-section of the ribbing portion 400 as described above may be provided such that the thickness of the ribbing portion 400 evolves from an increased vertical extension towards an increased lateral extension from and along the along the circumferential edge 101 and/or such that the ribbing portion 400 has a corresponding contorted outer surface.

Further, the ribbing portion 400 may extend from the circumferential edge 101 of the rim portion 252 of the container body 210 such that a space 220 is formed between the ribbing portion 400 and the outer surface 211 of the container body 210. The space 220 may be integrally filled. This is exemplarily illustrated in FIGS. 2 and 5. Space 220 is merely exemplarily indicated in these figures by a groove.

The handle portion 300 and the corresponding ribbing portion 400 may have a (combined) cross-section with a symmetrical profile. For example, the combined cross-section of the handle portion 300 and the corresponding ribbing portion 400 may be mirror symmetrical with respect to a plane that extends with the longitudinal axis and is perpendicular to the common plane CP (see FIG. 6). The combined cross-section may be opened towards the lower side of the dosing device 100. Preferably, the combined cross-section may be U-shaped when seen along the longitudinal axis LA.

This becomes particularly clear from FIGS. 2 and 5 to 7. The dosing device 100 may be symmetrical with respect to the longitudinal axis LA.

Naturally, it is also conceivable that the dosing device 100 may comprise additional ribbing portions 400 that may be provided on the lower side of the handle portion 300, for example.

Furthermore, a second aspect of the present invention relates to a method for manufacturing a dosing device 100 as described above. The method comprises the following steps:

The pulp material is dewatered. For this, the pulp material may be collected on a grid that has the (negative) shape of the dosing device 100. Vacuum suction may be applied. The dewatered pulp material is pressed into the form/shape of the dosing device 100. A drying step is completed thereafter. Then trimming of the dosing device 100 along external edges defined by the ribbing portion 400 may be completed.

The method may include additional treatment steps, for example to increase the smoothness or water resistance of the dosing device 100. Such steps may comprise the application of heat and pressure. Furthermore, a treatment step may include the colouring of the pulp material by adding colours to the pulp material. The dosing device 100 may include a further treatment step that includes embossing and/or debossing it for adding a brand name such as decoration elements 510, 520, which are exemplarily illustrated in FIGS. 1, 3 and 4. This is not only useful in brand communication, but can also increase the safety of the dosing device 100 by reducing the risk of accidental use for a different purpose. Also, an anti-slip surface pattern may be added to the dosing device 100, for example to its handle portion 300.

A third aspect of the present invention relates to a use of the aforementioned dosing device 100 for dosing a dosage material. Therein, the dosage material may be from the group consisting of powdered or granulated compositions. For example, the dosage material may be food compositions.

Correct dosing may be ensured by scraping off any excess dosage material from the container portion 200 after filling. Therefore, an appliance with a straight edge, such as a knife, may be used to scrape off any excess material from the filled container portion 200, so the container portion 200 contains exactly the defined volume 255.

The invention is not limited by the embodiments as described hereinabove, as long as being covered by the appended claims. All the features of the embodiments described hereinabove can be combined in any possible way and be provided interchangeably.

The invention claimed is:

1. A dosing device integrally made of molded pulp fiber, the dosing device comprising:
a container portion having a defined volume for receiving and retaining a dosage material, the container portion having a container body delimiting the defined volume, the container body having a rim portion circumferentially delimiting an opening at an upper side of the dosing device to access the defined volume;
a handle portion for manually moving the container portion relatively to the dosage material in a dosing process;
the handle portion is connected to an outer surface of the container body by a connecting portion of the handle portion and extends from the container body along a longitudinal axis;
the rim portion and the handle portion extend in a common plane and define a circumferential edge of the dosing device extending in the common plane; and
a ribbing portion, which extends from the circumferential edge at least at the handle portion to a lower side of the dosing device such that mechanical stresses acting on the container body in the dosing process are dissipated by the handle portion.

2. The dosing device according to claim 1, wherein the ribbing portion extends from the circumferential edge at least at the handle portion at opposite sides of the longitudinal axis.

3. A dosing device integrally made of molded pulp fiber, the dosing device comprising:
a container portion having a defined volume for receiving and retaining a dosage material, the container portion having a container body delimiting the defined volume, the container body having a rim portion circumferentially delimiting an opening at an upper side of the dosing device to access the defined volume;
a handle portion for manually moving the container portion relatively to the dosage material in a dosing process;
the handle portion is connected to an outer surface of the container body by a connecting portion of the handle portion and extends from the container body along a longitudinal axis;
the rim portion and the handle portion extend in a common plane and define a circumferential edge of the dosing device extending in the common plane; and
a ribbing portion, which extends from the circumferential edge at least at the handle portion to a lower side of the dosing device such that mechanical stresses acting on the container body in the dosing process are dissipated by the handle portion,
wherein the ribbing portion extends at its end opposite to the circumferential edge at least partially in a lower side plane that is offset and/or parallel to the common plane, and wherein the lower side plane delimits at least a part of the lower side of the dosing device along the handle portion.

4. A dosing device integrally made of molded pulp fiber, the dosing device comprising:
a container portion having a defined volume for receiving and retaining a dosage material, the container portion having a container body delimiting the defined volume, the container body having a rim portion circumferentially delimiting an opening at an upper side of the dosing device to access the defined volume;
a handle portion for manually moving the container portion relatively to the dosage material in a dosing process;

the handle portion is connected to an outer surface of the container body by a connecting portion of the handle portion and extends from the container body along a longitudinal axis;

the rim portion and the handle portion extend in a common plane and define a circumferential edge of the dosing device extending in the common plane; and a ribbing portion, which extends from the circumferential edge at least at the handle portion to a lower side of the dosing device such that mechanical stresses acting on the container body in the dosing process are dissipated by the handle portion, wherein the ribbing portion increases at the connecting portion in size.

5. The dosing device according to claim 4, wherein the ribbing portion extends at the connecting portion from the circumferential edge to the lower side of the dosing device such that the ribbing portion expands with increasing distance from the rim portion.

6. A dosing device integrally made of molded pulp fiber, the dosing device comprising:

a container portion having a defined volume for receiving and retaining a dosage material, the container portion having a container body delimiting the defined volume, the container body having a rim portion circumferentially delimiting an opening at an upper side of the dosing device to access the defined volume;

a handle portion for manually moving the container portion relatively to the dosage material in a dosing process;

the handle portion is connected to an outer surface of the container body by a connecting portion of the handle portion and extends from the container body along a longitudinal axis;

the rim portion and the handle portion extend in a common plane and define a circumferential edge of the dosing device extending in the common plane; and a ribbing portion, which extends from the circumferential edge at least at the handle portion to a lower side of the dosing device such that mechanical stresses acting on the container body in the dosing process are dissipated by the handle portion, wherein the ribbing portion extends from the circumferential edge at the rim portion such that a space between the ribbing portion and the container body is formed.

7. A dosing device integrally made of molded pulp fiber, the dosing device comprising:

a container portion having a defined volume for receiving and retaining a dosage material, the container portion having a container body delimiting the defined volume, the container body having a rim portion circumferentially delimiting an opening at an upper side of the dosing device to access the defined volume;

a handle portion for manually moving the container portion relatively to the dosage material in a dosing process;

the handle portion is connected to an outer surface of the container body by a connecting portion of the handle portion and extends from the container body along a longitudinal axis;

the rim portion and the handle portion extend in a common plane and define a circumferential edge of the dosing device extending in the common plane; and a ribbing portion, which extends from the circumferential edge at least at the handle portion to a lower side of the dosing device such that mechanical stresses acting on the container body in the dosing process are dissipated by the handle portion, wherein the ribbing portion is at least partially concave towards the upper side of the container body when seen from above.

8. A dosing device integrally made of molded pulp fiber, the dosing device comprising:

a container portion having a defined volume for receiving and retaining a dosage material, the container portion having a container body delimiting the defined volume, the container body having a rim portion circumferentially delimiting an opening at an upper side of the dosing device to access the defined volume;

a handle portion for manually moving the container portion relatively to the dosage material in a dosing process;

the handle portion is connected to an outer surface of the container body by a connecting portion of the handle portion and extends from the container body along a longitudinal axis;

the rim portion and the handle portion extend in a common plane and define a circumferential edge of the dosing device extending in the common plane; and a ribbing portion, which extends from the circumferential edge at least at the handle portion to a lower side of the dosing device such that mechanical stresses acting on the container body in the dosing process are dissipated by the handle portion, wherein the ribbing portion has a cross-section when seen along the circumferential edge, which comprises at least two ribbing sections, which extend successively in a row away from the handle portion and which are tilted with respect to each other and with respect to the common plane towards the lower side of the dosing device at a defined slope angle, respectively.

9. The dosing device according to claim 8, wherein the number of the ribbing sections and width of at least some of the ribbing sections change at least partially along the circumferential edge of the dosing device.

10. The dosing device according to claim 1, wherein the defined volume is delimited by the rim portion, a bottom portion and an inner lateral surface of the container body extending therebetween.

11. The dosing device according to claim 10, wherein the inner lateral surface is smooth and/or comprises a coating.

12. The dosing device according to claim 1, wherein the handle portion and the corresponding ribbing portion have a cross-section with a symmetrical profile and/or a cross-section opened towards the lower side of the dosing device.

13. The dosing device according to claim 1, wherein the defined volume ranges from 1 to 20 cm$^3$, and wherein the handle portion extends from 3 to 20 cm from the connecting portion to a distant end of the handle portion.

14. A method for manufacturing a dosing device, the method comprising:

dewatering pulp material;

pressing the dewatered pulp material into a form of the dosing device;

drying the formed dosing device; and trimming of the dosing device along external edges defined by a ribbing portion.

15. The method according to claim 14, wherein the dosing device comprises:

a container portion having a defined volume for receiving and retaining a dosage material, the container portion having a container body delimiting the defined volume, the container body having a rim portion circumferentially delimiting an opening at an upper side of the dosing device to access the defined volume;

a handle portion for manually moving the container portion relatively to the dosage material in a dosing process;

the handle portion is connected to an outer surface of the container body by a connecting portion of the handle portion and extends from the container body along a longitudinal axis;

the rim portion and the handle portion extend in a common plane and define a circumferential edge of the dosing device extending in the common plane; and a ribbing portion, which extends from the circumferential edge at least at the handle portion to a lower side of the dosing device such that mechanical stresses acting on the container body in the dosing process are dissipated by the handle portion.

16. The method according to claim 15, wherein the ribbing portion extends at its end opposite to the circumferential edge at least partially in a lower side plane that is offset and/or parallel to the common plane, and wherein the lower side plane delimits at least a part of the lower side of the dosing device along the handle portion.

17. The method according to claim 15, wherein the ribbing portion increases at the connecting portion in size.

18. The method according to claim 15, wherein the ribbing portion extends from the circumferential edge at the rim portion such that a space between the ribbing portion and the container body is formed.

19. The method according to claim 15, wherein the ribbing portion is at least partially concave towards the upper side of the container body when seen from above.

20. The method according to claim 15, wherein the ribbing portion has a cross-section when seen along the circumferential edge, which comprises at least two ribbing sections, which extend successively in a row away from the handle portion and which are tilted with respect to each other and with respect to the common plane towards the lower side of the dosing device at a defined slope angle, respectively.

* * * * *